United States Patent
Politi et al.

[11] Patent Number: 5,898,470
[45] Date of Patent: Apr. 27, 1999

[54] ELECTRIC PATH FRAME CONSTRUCTION FOR EYEWEAR

[75] Inventors: Norbert B. Politi; Richard J. Podolak, both of Rochester; Simon M. Conway, Lima, all of N.Y.

[73] Assignee: Bausch & Lomb Incorporated, Rochester, N.Y.

[21] Appl. No.: 08/985,504

[22] Filed: Dec. 5, 1997

[51] Int. Cl.$^6$ .................. G02C 5/14; G02C 1/00
[52] U.S. Cl. .................. 351/111; 351/117; 351/158; 429/209
[58] Field of Search ................... 351/111, 117, 351/158; 338/214; 429/209, 210, 238; 219/532, 550; 381/370, 380

[56] References Cited

U.S. PATENT DOCUMENTS

| | | | |
|---|---|---|---|
| 3,160,735 | 12/1964 | Aufricht | 219/201 |
| 3,620,866 | 11/1971 | Letter | 156/102 |
| 3,853,393 | 12/1974 | Fila | 351/111 |
| 5,369,857 | 12/1994 | Sacherman et al. | 381/370 |
| 5,661,266 | 8/1997 | Chang | 338/214 |

FOREIGN PATENT DOCUMENTS

0555062A1  8/1993  European Pat. Off. .

*Primary Examiner*—Huy Mai
*Attorney, Agent, or Firm*—Katherine McGuire

[57] ABSTRACT

An electrically conductive framework for eyewear providing mutually insulated, plural conducting paths placed in coaxial relationship. The base metal of the eyewear frame comprises the first electrically conductive lead with an insulative coating being applied over the base metal followed by a second, outer conductive layer and a protective sheath. The outer conductive layer comprises the second lead of the circuit, with masking or abrading of the insulative layer at selected points along the framework establishing the needed contacts to the base metal core. The framework provides the electric path of a circuit including a power source and any desired electronic component on the eyewear.

12 Claims, 2 Drawing Sheets

ELECTRIC PATH FRAME CONSTRUCTION FOR EYEWEAR

BACKGROUND OF THE INVENTION

The present invention relates to electronic applications in eyewear, and more particularly relates to a novel construction in electrically conductive eyewear frames.

There are at present many different electronic applications for eyewear intended for both entertaining and utilitarian functions. For example, in U.S. Pat. No. 4,254,451 flashing LED's are placed about the front frame of an eyewear to create an entertaining visual effect. More importantly, examples of electronic utilitarian applications include electrooptical devices applied to eyewear such as electrochromic (EC) and liquid nematic crystals to control light transmissivity through the eyewear lenses (e.g., U.S. Pat. Nos. 5,455,637 and 5,276,539, respectively), heat-generating resistors for anti-fogging of the lenses (e.g., U.S. Pat. No. 5,459,533), and devices which change the optical properties of the lenses which affect vision through the lenses (e.g., U.S. Pat. No. 5,229,885). Still other utilitarian applications of electronics in an eyewear frame include hearing devices (e.g., hearing aids, such as seen in U.S. Pat. No. 3,853,393) and devices which project an image on the back-side of a lens for viewing by the wearer (e.g., U.S. Pat. No. 5,463,428).

Despite the decades of work in this art, there remains a need for an electrically conductive framework for eyewear which successfully integrates both form and function. Location of the power source, logic and switching controls in combination with electrically connecting and routing these and other components through the eyewear frame pose enormous design challenges due to the size constraints and need for a portable, closed system for eyewear. Furthermore, the electronic design must be readily adaptable to changes (sometimes drastic) in eyewear styles popular from year to year.

SUMMARY OF THE INVENTION

The present invention successfully addresses the above-noted design challenges by providing an eyewear frame construction for establishing an electric path through an eyewear frame which is readily adaptable to a potentially infinite variety of electronic applications and eyewear styles. More particularly, the present invention comprises mutually insulated, plural conducting paths placed in coaxial relationship which provides an electrically conductive, basic framework from which the final eyewear product may be constructed. As such, an electric conducting path may be established for the entire eyewear frame which has a very small overall diameter at any given point along the eyewear frame.

Heretofore, electric conducting paths in eyewear have required bulky frameworks since the electric leads and the eyewear frame were viewed as separate components which had to be somehow integrated. This resulted in the large front and temple diameters and widths typical of prior art electronic eyewear devices. The present invention, by providing the separate conducting paths in a coaxial relationship wherein the core or central conducting path preferably comprises the base metal or core of a typical eyewear frame, is able to provide an electrically conductive frame for eyewear which is of minimal overall dimensions, thereby providing ample space on this basic framework for a variety of finished eyewear design choices.

In the preferred embodiment, the base metal core is formed from NiAg, for example, and provides the positive charge through connection to a power source located in the temple tip or other desired location. If desired, additional conductive layers may be applied to the base metal; for example, the NiAg base metal core may be further electroplated with a thin gold layer. An insulative coating, for example a dielectric layer such as a conformable electrophoretic coating ("E-coat"), Silicon, Quartz,, or Aluminum Nitride, is applied to the base metal core, followed by an outer conductive layer (e.g., ZrNi, Al or TiNi), applied over the insulative layer. The insulative layer may be applied by dipping, baking or a charged particle process, for example. The outer conductive layer provides the negative charge via connection to the power source.

A number of different deposition methods may be chosen for the outer metal coating such as EVAD (evaporation), PVD (physical vapor deposition), CVD (chemical vapor deposition), and sputtering. Terminal connections for the electronics may be provided by either masking the framework at selected locations during deposition, or removing material following the deposition process (e.g., by abrading). Lastly, the framework may be encapsulated within an outer protective sheath, if desired.

DETAILED DESCRIPTION

Figure 4:
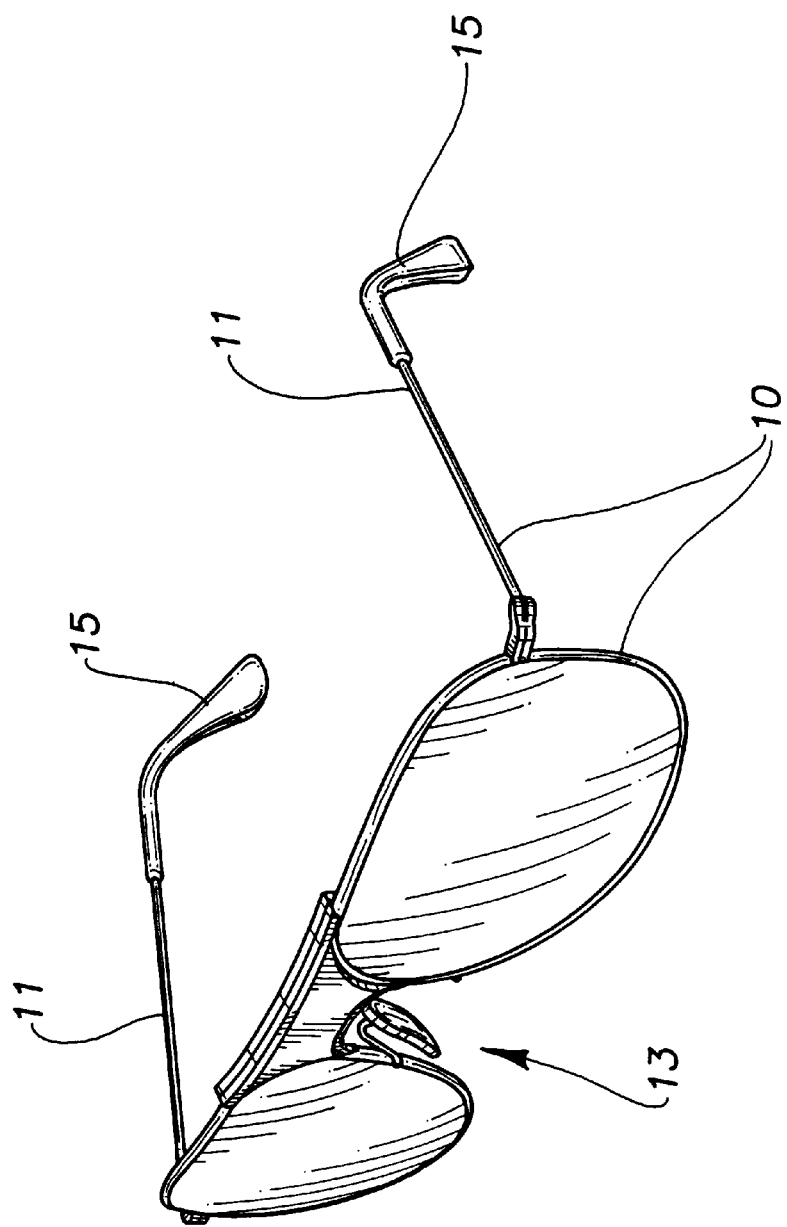
FIG. 4 is a perspective view of an eyewear frame employing the inventive conductive framework.

Referring to the drawing, there is seen in the Figures an electrically conductive framework 10 for eyewear such as seen in FIG. 4. Framework 10 basically comprises a first, inner conductive core layer 12, a middle insulative layer 14, and a second, outer conductive layer 16, all formed in a co-axial relation. In the preferred embodiment, framework 10 is substantially rigid whereby the basic eyewear components such as the temples 11 and the front 13 may be constructed using the conductive framework 10.

The inner conductive core layer 12 preferably comprises a hardened metal alloy such as 18% NiAg having a diameter of 1.35 mm, for example. This would be a logical choice of material since many present-day eyewear frames have a metal base wire formed from NiAg, and hence the material is familiar to those skilled in the art. It will thus also be appreciated that the basic configuration of the eyewear frame will be dictated by the configuration into which the core material 12 is bent or otherwise formed. Additional conductive layers may be applied directly to core 12 prior to application of insulative coating 14, if desired. For example, core 12 may be electroplated with a thin layer (e.g., 40 micro inches) of gold.

Figure 2:
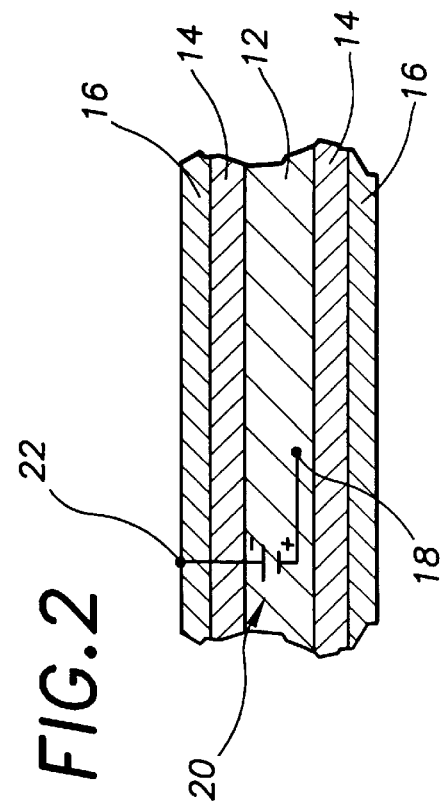
FIG. 2 is a cross-sectional view as taken along the line 2—2 in FIG. 1.

The middle, insulative coating 14 is applied over core 12. Possible materials which may be used for insulative coating 14 include E-Coat; AlNi; Silicon; and Quartz, and may be applied using any one of a number of known deposition techniques (e.g., sputtering in a vacuum; CVD; PVD; PVDC; EVAD and plasma polarization). The thickness of insulative coating 14 is preferably in the range of about 12 to about 20 microns, and most preferably is about 15 microns thick. Masking may be applied at selected points along core 12 prior to deposition of insulative layer 14 to provide non-insulated contact areas for electrode connection, such as at 18, of electrical components (not shown) to core 12. Alternatively, selected areas of insulative layer 14 may be abraded away to reveal contact areas for electrode connection. Core 12 preferably connects to the positive terminal of the battery source 20 seen schematically in FIGS. 2 and 3. Location of the battery source 20 is preferably in the temple tip 15, but may of course be located at any desired location along the eyewear frame.

Figure 3:
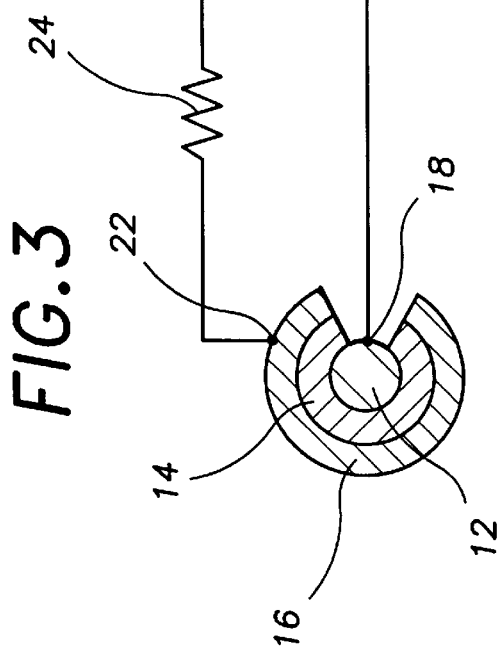
FIG. 3 is a cross-sectional view of the framework showing electrode connection to a pair of lead wires.
Figure 1:
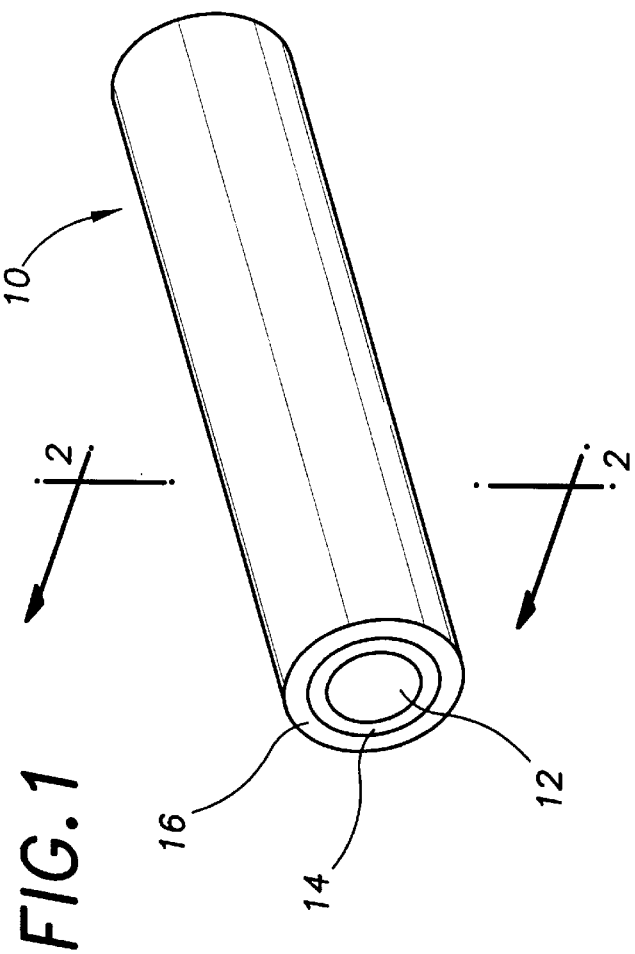
FIG. 1 is an enlarged, cross-sectional view of a part of the electrically conducting eyewear framework constructed according to the invention.

Lastly, second, outer conductive layer 16 is applied over insulative layer 14, again using any one of a number of available deposition techniques such as those listed above. Outer layer 16 may consist of any desired conductive material, but preferably is either ZrNi (zirconium nitride) or TiNi (titanium nitride). An additional conductive layer, such as a thin gold layer, may be applied directly to layer 16, if desired, for improved conductivity. Outer conductive layer 16 is preferably connected to the negative terminal of battery source 20 via electrode connection 22 which may be at any selected point along the eyewear frame 10. Referring to FIG. 3, an electronic component, shown schematically as a load 24, may be connected to the eyewear frame 10 at any desired location, and is electrically connected to the framework 10 via electrodes 18 and 22.

Referring to FIG. 4, it may thus be realized that an electrically conductive frame 10 of minimal dimensions is provided from which a finished eyewear style may be constructed. It is intended that framework 10 be encapsulated in a protective outer sheathing, which outer sheathing will contribute to the aesthetic form of the finished eyewear style. It will be appreciated that the minimal diameter of framework 10 allows a very large design latitude when designing the finished eyewear style, thus enabling flexibility in design changes.

What is claimed is:

1. An electrically conductive framework for eyewear comprising a conductive core; an insulative layer; and an outer conductive layer all placed in co-axial relationship to one another with said insulative layer located between said core and said outer conductive layer with said core and said outer conductive layer forming the positive and negative leads of the framework.

2. The framework of claim 1 wherein said inner layer forms the positive lead and said outer layer forms said negative lead.

3. The framework of claim 1 wherein said core is formed from NiAg.

4. The framework of claim 3 and further comprising a thin gold layer applied directly to said core in complete covering relation thereto.

5. The framework of claim 1 wherein said insulative layer is formed form a material selected from the group consisting of E-Coat; AlNi; Silicon; and Quartz.

6. The framework of claim 1 wherein said outer conductive layer is formed of ZrNi (zirconium nitride) or TiNi (titanium nitride).

7. The framework of claim 6 and further comprising a thin gold layer applied directly to said outer conductive layer in complete covering relation thereto.

8. The framework of claim 7 and further comprising a protective sheathing applied to said framework in complete covering relation to said outer conductive layer.

9. The framework of claim 1 and further comprising a protective sheathing applied to said framework in complete covering relation to said gold layer.

10. The framework of claim 1 wherein said eyewear includes a front and two temples formed from said framework.

11. The framework of claim 1 wherein said eyewear includes a power source which is electrically connected to said framework.

12. The framework of claim 11 wherein said eyewear includes an electrooptical device electrically connected to said power source via said framework.

\* \* \* \* \*